United States Patent Office 3,767,692
Patented Oct. 23, 1973

3,767,692
XANTHATE MANUFACTURE
Chu-Jen Chia, Brossard, Quebec, Canada, assignor to Canadian Industries Limited, Montreal, Quebec, Canada
No Drawing. Filed May 15, 1972, Ser. No. 253,477
Claims priority, application Canada, May 31, 1971, 114,435
Int. Cl. C07c *154/02*
U.S. Cl. 260—455 B  3 Claims

ABSTRACT OF THE DISCLOSURE

An improvement in the process for the manufacture of alkali metal xanthates by the reaction of an alkyl alcohol, carbon disulphide and alkali hydroxide in the presence of an inert diluent. The improvement resides in the reduction of scale formation on the surface of the heat exchanger of the reaction vessel by addition of pellets of an inert plastic material to the reaction mixture. The use of the pellets permits an increase in the rate of production of alkali metal xanthates.

---

This invention relates to an improvement in a process for the manufacture of alkali metal xanthates.

In Canadian Pat. No. 862,137 in the names of R. H. Brickell and G. R. Lusby issued on Jan. 26, 1971, there is described a process for the manufacture of alkali metal xanthates wherein carbon disulphide and an alkyl alcohol are mixed with a water-immiscible inert diluent followed by addition of aqueous alkali solution to the mixture. The reaction with the alkali solution is exothermic and cooling of the reaction vessel is desirable in order to shorten the time required to add the alkali solution. However, it has been found that there is a tendency for the product to form scale on the surface of the heat exchanger employed to cool the reaction mixture. The buildup of scale reduces heat transfer and increases the time required to add the alkali solution. The scaling of the heat exchanger surfaces is especially serious during the manufacture of sodium amyl xanthate by the above process.

It has now been found that the heat exchanger surfaces of reactors employed in the manufacture of alkali metal xanthates can be kept substantially free of scale by adding pellets of an inert plastic to the reaction mixture of carbon disulphide, alkyl alcohol and aqueous alkali. The pellets are agitated with the ingredients of the reaction mixture during the reaction and when the reaction is complete are separated from the reaction mixture. The use of pellets of plastic results in a marked decrease in the time required to carry out the preparation of alkali metal xanthate.

It is thus a primary object of the invention to provide a decrease in the reaction time of a process for the manufacture of alkali metal xanthates. Additional objects will appear hereinafter.

The invention which is an improvement in the manufacture of alkali metal xanthates by the exothermic reaction of an alkyl alcohol, carbon disulphide and an alkali metal hydroxide in the presence of a water-immiscible inert diluent at a temperature not exceeding 25° C. in an agitated reaction vessel cooled by a heat exchanger, comprises adding to the reaction mixture pellets of a plastic which is inert to the ingredients of the reaction mixture. The xanthate product of the reaction preferably is recovered from the reaction mixture by extraction with water.

The reaction between an alkyl alcohol, carbon disulphide and an alkali metal hydroxide can be represented by the following equation

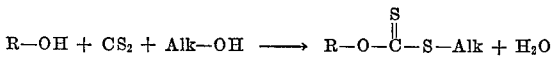

$$R-OH + CS_2 + Alk-OH \longrightarrow R-O-\overset{\underset{\|}{S}}{C}-S-Alk + H_2O$$

where R—OH is a monohydric alcohol and Alk—OH is an alkali metal hydroxide. The proportions of the reactants will normally be in the range wherein the mole ratios of alkali metal hydroxide/carbon disulphide/alkyl alcohol are between 1.0/1.0/1.0 and 1.2/2.0/1.0. It is preferable to add the water-immiscible inert diluent to the reaction mixture in proportions of from 100% to 300% by weight of the alkyl alcohol reactants.

The plastic from which the pellets employed in the process are fabricated should be inert to the ingredients of the reaction mixture. Suitable materials are polyethylene and polyvinyl chloride. The size of the pellets is not critical except that they should be capable of passing freely around the cooling coils of the heat exchanger. Pellets having a maximum linear dimension of ⅛ inch have been found to act satisfactorily. Preferably the pellets will have sharp edges. The pellets will comprise about 2% by volume of the reaction mixture.

Suitable alkyl alcohol ingredients include ethyl alcohol, n-propyl alcohol, isopropyl alcohol, n-butyl alcohol, isobutyl alcohol, sec-butyl alcohol, amyl alcohols including refined fusel oil which is mainly isoamyl alcohol, and hexyl alcohols.

The preferred alkali metal hydroxide ingredients are sodium hydroxide and potassium hydroxide.

Suitable inert diluents include kerosene, mineral spirits, gasoline, toluene, isopropyl ether and heptane. Mineral spirits low in aromatics has the advantage of being less soluble in aqueous xanthate solutions than aromatic liquids such as toluene. The preferred mineral spirits is low in aromatics and has a boiling range of 155° C. to 195° C.

The process of the invention is carried out in a reaction vessel equipped with a heat exchanger adapted to remove the heat of the reaction. The heat exchanger may be a system of metal pipes immersed in the reaction mixture and carrying a liquid coolant such as water. The reaction vessel is also equipped with means for agitating the reaction mixture such as a motor driven stirrer.

In the preferred embodiment of the invention the inert diluent, the alkyl alcohol and carbon disulphide, all at room temperature, are run into the reaction vessel described above. These ingredients are then mixed by agitation and the pellets are added to the reaction mixture. The alkali metal hydroxide is then added slowly either as an aqueous solution or as a dispersion of solid in an aqueous solution. The rate of addition is adjusted to prevent the temperature from rising above about 25° C. After the addition of the alkali metal hydroxide is completed agitation is continued until the reaction forming the xanthate is complete.

The xanthate product is recovered from the reaction mixture either by extraction with water to give an aqueous solution of the xanthate or by filtration of the solids.

The pellets can be collected easily when the reaction is complete by use of a suitable mesh sieve or by gravity separation.

The process of this invention can be applied to the manufacture of all alkali metal xanthates but has been found especially effective in the case of sodium amyl xanthate where it has reduced the time of addition of alkali metal hydroxide ingredient from 14.0 hours to 0.5 hour.

The characteristics of the seven preparations are shown in the following table. It can be seen that the use of plastic pellets reduces greatly the time of addition of the sodium hydroxide solution.

TABLE

| Preparation number | Flow rate of cooling water, g.p.m. | Temperature of cooling water, °F. | Temperature differential of cooling water (out-in) °F. | | Heat transfer coefficient (B.t.u./ °F./ft.²/hr.) | | Time of addition of NaOH, hours | Yield, percent | Thickness of scale on coil, in. | Type of pellet |
|---|---|---|---|---|---|---|---|---|---|---|
| | | | Initial* | End Δ | Initial* | End Δ | | | | |
| 1 | 0.30 | 51 | 31 | 8 | 48 | 8 | 14.0 | 83 | ⅛ | None. |
| 2 | 0.30 | 51 | 32 | 7 | 53 | 8 | 12.0 | 87 | ⅛ | Do. |
| 3 | 0.30 | 51 | 28 | 21 | 55 | 30 | 4.5 | 92 | <1/16 | Polyethylene. |
| 4 | 0.30 | 51 | 31 | 23 | 55 | 42 | 3.5 | 94 | 0.0 | Polyvinyl chloride. |
| 5 | 0.30 | 39 | 35 | 31 | 47 | 34 | 2.7 | 91 | 0.0 | Do. |
| 6 | 2.65 | 46 | 10 | 10 | 154 | 154 | 0.5 | 85 | 0.0 | Do. |
| 7 | 2.65 | 50 | 10 | 10 | 115 | 115 | 0.5 | 88 | 0.0 | Do. |

*Average in first 30 minutes.

Note.—Δ Average in 30 minutes prior to completion of NaOH addition.

The invention is additionally illustrated by the following example but the scope of the invention is not limited to the embodiment shown therein.

EXAMPLE

Into a 45 gallon (Imperial) reaction vessel fitted with a steel cooling coil carrying flowing water and an agitator driven at 300 r.p.m. were charged the following ingredients

| | Lbs. |
|---|---|
| Mineral spirits B.P. 155° C.–195° C. | 154 |
| Carbon disulphide | 50 |
| Isoamyl alcohol (fusel oil) | 53 |

The above ingredients were mixed and 45 pounds of 60% by weight aqueous sodium hydroxide solution were added at such a rate that the temperature of the reaction mixture did not exceed 25° C. After completion of the reaction the sodium amylxanthate product was separated by extraction with water and the yield determined by analysis.

The above preparation was duplicated with more rapid addition of the sodium hydroxide ingredient (12 hour time of addition instead of 14 hours).

Five additional preparations were carried out analogous to the first two except that in each case prior to introduction of the sodium hydroxide solution 1 gallon of pellets, either cylindrical (⅛ inch x ⅛ inch) polyethylene or rectangular (⅛ inch x ⅛ inch x 1/16 inch) polyvinyl chloride, were added to the reaction mixture.

What we claim is:

1. In a process for the manufacture of alkali metal xanthates by the exothermic reaction of an alkyl alcohol, carbon disulphide and an alkali metal hydroxide in the presence of an inert diluent at a temperature not exceeding 25° C. in an agitated reaction vessel cooled by a heat exchanger, the improvement comprising adding to the reaction mixture pellets of a plastic selected from the group consisting of polyethylene and polyvinyl chloride, said pellets having dimensions within the range 1/16 inch to ⅛ inch.

2. An improved process as claimed in claim 1 wherein the pellets comprise about 2% by volume of the reaction mixture.

3. An improved process as claimed in claim 1 wherein the sequence of the process comprises (1) mixing the alkyl alcohol, carbon disulphide and inert diluent with agitation (2) adding the pellets to the mixture and (3) adding the alkali metal hydroxide to continuously agitated mixture of alkyl alcohol, carbon disulphide inert diluent and pellets.

References Cited

UNITED STATES PATENTS

| 2,994,594 | 8/1961 | Haines | 23—285 |
|---|---|---|---|
| 3,650,698 | 3/1972 | Adler | 23—253 |

LEWIS GOTTS, Primary Examiner

D. R. PHILLIPS, Assistant Examiner